(12) United States Patent
Rossi et al.

(10) Patent No.: US 8,947,109 B2
(45) Date of Patent: Feb. 3, 2015

(54) PROTECTION DEVICE, CORRESPONDING METHOD AND COMPUTER SOFTWARE PRODUCT

(75) Inventors: Laurent Rossi, Dreux (FR); Bernard Schang, Le Mesnil Saint Denis (FR)

(73) Assignee: Compagnie Industrielle et Financiere d'Ingenierie "Ingenico", Neuilly-sur-Seine (FR)

( * ) Notice: Subject to any disclaimer, the term of this patent is extended or adjusted under 35 U.S.C. 154(b) by 309 days.

(21) Appl. No.: 13/233,597

(22) Filed: Sep. 15, 2011

(65) Prior Publication Data

US 2012/0062252 A1   Mar. 15, 2012

(30) Foreign Application Priority Data

Sep. 15, 2010   (FR) ...................................... 10 57385

(51) Int. Cl.
| | | |
|---|---|---|
| *G01R 27/26* | (2006.01) | |
| *G06F 21/86* | (2013.01) | |
| *H01L 23/00* | (2006.01) | |
| *G07F 19/00* | (2006.01) | |

(52) U.S. Cl.
CPC ............... *G06F 21/86* (2013.01); *H01L 23/576* (2013.01); *G07F 19/20* (2013.01); *G07F 19/205* (2013.01); *G07F 19/2055* (2013.01)
USPC ............................. 324/686; 340/562; 235/380

(58) Field of Classification Search
None
See application file for complete search history.

(56) References Cited

U.S. PATENT DOCUMENTS

| | | |
|---|---|---|
| 5,446,391 A | 8/1995 | Aoki et al. |
| 6,390,367 B1 | 5/2002 | Doig |
| 6,853,093 B2 | 2/2005 | Cohen et al. |
| 6,983,378 B1 | 1/2006 | Kokubo |
| 7,015,823 B1 | 3/2006 | Gillen et al. |

(Continued)

FOREIGN PATENT DOCUMENTS

| | | |
|---|---|---|
| EP | 1804557 A1 | 7/2007 |
| EP | 1873680 A1 | 1/2008 |

(Continued)

OTHER PUBLICATIONS

Analog Devices AD7142 Data Sheet, 2007, Analog Devices Inc., p. 1.*

(Continued)

*Primary Examiner* — Melissa Koval
*Assistant Examiner* — Stephen G Armstrong
(74) *Attorney, Agent, or Firm* — David D. Brush; Westman, Champlin & Koehler, P.A.

(57) ABSTRACT

A device is provided for protecting an electronic payment terminal, which includes at least one printed circuit and one casing. The device includes at least one capacitive detector having a first part electrically connected to the printed circuit and a second part mounted within the casing of the electronic payment terminal without being electrically connected to the first part. The at least one capacitive detector is configured to deliver a reference capacitance when it is mounted in the electronic payment terminal. The device also includes a capacitive measurement microprocessor electrically connected to the at least one capacitive detector and configured to detect a variation in capacitance of the at least one capacitive detector. The device includes a transmitter for transmitting a piece of information representing the variation in capacitance when an absolute value of a difference between the measured capacitance and the reference capacitance exceeds a predetermined threshold.

9 Claims, 3 Drawing Sheets

(56) References Cited

U.S. PATENT DOCUMENTS

| | | | |
|---|---|---|---|
| 7,024,565 B1* | 4/2006 | Beiley et al. | 713/194 |
| 2007/0295810 A1 | 12/2007 | Hopt et al. | |
| 2007/0296709 A1 | 12/2007 | GuangHai | |
| 2008/0278355 A1 | 11/2008 | Moore et al. | |
| 2009/0058628 A1 | 3/2009 | Kirmayer | |
| 2009/0271004 A1 | 10/2009 | Zecchin et al. | |
| 2010/0090714 A1* | 4/2010 | Van Geloven et al. | 324/705 |
| 2011/0095919 A1 | 4/2011 | Ostermoller et al. | |

FOREIGN PATENT DOCUMENTS

| | | | |
|---|---|---|---|
| EP | 1927931 A1 | | 6/2008 |
| EP | 2109058 A1 | * | 10/2009 |
| FR | 2857113 A1 | | 1/2005 |
| WO | 2009103594 A1 | | 8/2009 |
| WO | 2010007314 A2 | | 1/2010 |

OTHER PUBLICATIONS

Machine English translation of European Patent Application Publication to Inventors Soubirane, A. and Pavageau, S. EP2109058A1, Oct. 14, 2009. Translation of pp. 2-6 created on Mar. 27, 2014.*

Office Action dated Jan. 14, 2013 for corresponding U.S. Appl. No. 13/233,573, filed Sep. 15, 2011.

French Search Report dated May 24, 2011 for corresponding French Application No. FR1057387, filed Sep. 15, 2010.

French Search Report dated May 18, 2011 for corresponding French Application No. FR1057385, filed Sep. 15, 2010.

French Search Report dated Aug. 12, 2011 for corresponding French Application No. FR1057383, filed Sep. 15, 2010.

French Search Report dated May 17, 2011 for corresponding French Application No. FR1057381, filed Sep. 15, 2010.

Final Office Action dated Apr. 8, 2014 from the United States Patent and Trademark Office for corresponding U.S. Appl. No. 13/233,601, filed Sep. 15, 2011.

Notice of Allowance dated May 22, 2014 from the United States Patent and Trademark Office for corresponding U.S. Appl. No. 13/233,567, filed Sep. 15, 2011.

Machine Translation of WIPO Patent Application Publication to Inventor Pierre Lacroix WO 2010/007314 A2, Jan. 21, 2010. Translation pf. pp. 1-15. created on Aug. 11, 2013.

Office Action dated Aug. 27, 2013 for corresponding U.S. Appl. No. 13/233,567, filed Sep. 15, 2011.

Notice of Allowance dated Jun. 21, 2013 from the United States Patent and Trademark Office for corresponding U.S. Appl. No. 13/233,573, filed Sep. 15, 2011.

Office Action dated Oct. 24, 2013 from the United States Patent and Trademark Office for corresponding U.S. Appl. No. 13/233,601, filed Sep. 15, 2011.

Final Office Action dated Mar. 5, 2014 for corresponding U.S. Appl. No. 13/233,567, filed Sep. 15, 2011.

Notice of Allowance dated Jul. 22, 2014 for U.S. Appl. No. 13/233,601, filed Sep. 15, 2011.

* cited by examiner

PROTECTION DEVICE, CORRESPONDING METHOD AND COMPUTER SOFTWARE PRODUCT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the securing of payment devices.

The present disclosure pertains more particularly to a device enabling the detection of an intrusion into an electronic payment terminal or an opening of this terminal aimed at fraudulently obtaining confidential data such as bank data.

There are many devices enabling users to pay for purchases. More particularly, payment devices using bank cards such as smart chip cards or smart magnetic stripe cards have become widespread. These devices are generally called payment terminals and enable simple and quick payment for purchases. There are other devices too using smart chip or magnetic stripe cards: these are for example bank terminals such as automated teller machines or automated cash dispensers. Here below, all these devices, which include both an entry keypad and a memory card reader are called payment terminals.

Owing to the data handled, payment terminals attract the attentions of fraudulent individuals. These individuals use every possible means to try and access the confidential data that are exchanged in the terminals.

One of the ways of accessing these pieces of data consists is to introduce a bug into the terminal. This bug is used to retrieve data exchanged between the terminal and the bank card to make a copy of this confidential data with the aim of forging false payment cards.

BACKGROUND OF THE DISCLOSURE

All payment terminal providers and a certain number of third-party providers are capable of providing anti-intrusion solutions of varying degrees of efficiency.

Indeed, the fraudulent individuals constantly increase their ingenuity when trying to circumvent such and such a protection measure.

For obvious reasons of security, the opening of an electronic payment terminal or the intrusion of a foreign element into an electronic payment terminal or again the assembling of a terminal are impermissible operations.

Anti-intrusion measures being proposed include the application of false keys which are used to detect the opening of the terminal. When the terminal is mounted, the keypad of the terminal exerts pressure on the false keys which are therefore in permanent contact with the printed circuit. When the keypad is removed, the false keys are no longer in contact with the printed circuit and the security processor activates the requisite protection measures. One of the problems with these false keys is related to the fact that additional mechanical parts need to be provided on the keypad support to detect the dismantling of the keypad. These additional mechanical parts are costly.

We may also cite the use of lattices for protecting printed circuits to prevent the insertion of probes. A probe generally takes the form of an almost invisible thin metal wire that is inserted into the electronic payment terminal through the bank card insertion slot to access the contacts between the bank card and the card reader (these contacts are also called "pins").

There are many other existing measures. However, these measures are not always efficient.

One protective solution that can be envisaged is that of preventing the re-assembly of a terminal from parts belonging to other terminals. This solution comes into play when fraudulent individuals try to fabricate or reassemble a terminal. This is a problem complementary to that of intrusion.

To date, there is no approach by which this problem can be resolved for a cost deemed to be reasonable. Indeed, it is theoretically possible to provide the components of the terminal with identification. To this end, each component must be provided with an identifier, for example an RFID, and a security processor installed in the terminal has to be provided with the list of the identifiers of the In addition to being complex this operation also costly since the RFID tags used to identify the components considerably increase the cost of the terminal. Now, it is important to provide payment terminals that users can trust and that are not excessively costly to produce.

SUMMARY

An exemplary embodiment of the invention does not have the drawbacks of the prior art.

An exemplary embodiment of the invention pertains to a device for protecting an electronic payment terminal comprising at least one printed circuit and one casing, the device for protecting being characterized in that it comprises:

at least one capacitive detector comprising two parts, a first part electrically connected to said printed circuit and a second part mounted within said casing of said electronic payment terminal without being electrically connected to said first part, said at least one capacitive detector being configured to deliver a reference capacitance when it is mounted in said electronic payment terminal;

a capacitive measurement microprocessor electrically connected to said at least one capacitive detector, configured to detect a variation in capacitance of said at least one capacitive detector;

means for transmitting a piece of information representing said variation of capacitance when an absolute value of a difference between said measured capacitance and said reference capacitance exceeds a predetermined threshold.

Thus, an exemplary embodiment of the invention makes it possible to sense an attempted intrusion or dismantling of the electronic payment terminal. Indeed, any such attempt against a portion of the terminal protected by the device of an exemplary embodiment of the invention prompts a variation in the measured capacitance beyond a predefined value and leads to the transmission of information on this variation to the security microprocessor of the terminal which takes the necessary measures (for example the erasure of the secured memory).

An exemplary embodiment of the invention thus improves the security of the electronic payment terminal and more particularly participates in an active securing of the terminal.

According to one particular embodiment, said device for protecting further comprises calibration means delivering said reference capacitance.

According to one particular embodiment, said capacitive detector further comprises a third part consisting of at least one polyhedral element lined with a conductive surface.

According to one particular characteristic, said at least one third part is positioned on said casing of said terminal.

According to one particular characteristic, said at least one third part defines a unique capacitance associated with said casing of said terminal.

According to another aspect, an exemplary embodiment of the invention also pertains to a method for protecting an electronic payment terminal comprising at least one printed circuit and one casing, said device for protecting comprising:

at least one capacitive detector comprising two parts, a first part electrically connected to said printed circuit and a second part mounted within said casing of said electronic payment terminal without being electrically connected to said first part, said at least one capacitive detector being configured to deliver a reference capacitance when it is mounted in said electronic payment terminal;

a capacitive measurement microprocessor electrically connected to said at least one capacitive detector, configured to detect a variation in capacitance of said at least one capacitive detector;

means for transmitting a piece of information representing said variation of capacitance when an absolute value of a difference between said measured capacitance and said reference capacitance exceeds a predetermined threshold.

According to an exemplary embodiment of the invention, said method for protecting comprises at least one iteration of the following steps:

measuring a current value of capacitance by means of said capacitive detector;

computing said absolute value of a difference between said measured capacitance and said reference capacitance;

transmitting said piece of information representing said variation of capacitance when said absolute value exceeds said predetermined threshold According to an exemplary embodiment of the invention, said method for protecting comprises, during a first powering on of said electronic payment terminal, a step for calibrating said terminal delivering said reference capacitance.

An exemplary embodiment of the invention thus improves the security of the electronic payment terminal and more particularly takes part in an active securing of the terminal.

According to another aspect, an exemplary embodiment of the invention pertains to a computer software product downloadable from a communications network and/or stored on a computer-readable carrier and/or executable by a microprocessor. According to an exemplary embodiment of the invention, such a computer software program comprises program code instructions to execute the protection method as described here above when it is executed on a microprocessor.

BRIEF DESCRIPTION OF THE DRAWINGS

Other features and advantages shall appear more clearly from the following description of an embodiment, given by way of a simple illustrative and non-exhaustive example and from the appended drawings, of which.

DETAILED DESCRIPTION OF ILLUSTRATIVE EMBODIMENTS

1. Description of an Embodiment

The principle of an exemplary embodiment of the invention provides the electronic payment terminal with an ability to monitor its internal capacitive environment and implement security measures based on the measurement of capacitances.

Implementing such measures is simpler than implementing a multiplicity of protection devices and methods, generally based both on a mechanical component and on an electronic component. On the contrary, the measurement of capacitance by the electronic payment terminal, at the units to be protected, is simple and requires only the installation of a conductive element such as for example an electrical wire or a conductive paint.

In one embodiment, the invention also enables the implementing of a hardware identification of the terminal that is simple and costs little. An exemplary embodiment of the invention also makes it possible to manage anti-intrusion devices simply and at low cost. An exemplary embodiment of the invention relies on a capacitive measurement made between one or more capacitive detectors which are formed by at least two parts. Thus, unlike in classic capacitive detectors enabling a detection of a variation in capacitance, for example when an object is brought close to a detector, an exemplary embodiment of the invention proposes capacitive detectors made up of several parts.

An exemplary embodiment of the invention thus proposes the detecting of a modification of the capacitance (i.e. a modification of the electrical charge) of the detector when one of the parts of the detector is shifted or modified relatively to the other part of the detector.

To this end, the device according to an exemplary embodiment of the invention comprises at least one capacitive detector comprising two parts, a first part electrically connected to said printed circuit and a second part mounted within said casing, said at least one capacitive detector being configured to deliver a reference capacitance. This capacitive detector includes a preliminarily determined capacitance known to a capacitive measurement microprocessor, electrically connected to the capacitive measurement support and configured to detect a variation in capacitance of the capacitive measurement support. The device also comprises a transmitter configured for transmitting a piece of information representing variation in capacitance when an absolute value of a difference between a measured capacitance at a given instant and the reference capacitance exceeds an also predetermined threshold.

Here below, we present exemplary embodiments. These embodiments can of course be combined within one and the same terminal in order that several security measures may be available.

2. False Keys

Figure 1:
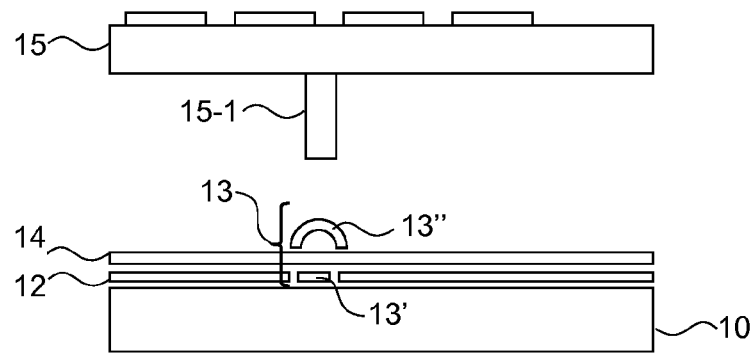
FIG. 1 is a drawing of a detection device according to an embodiment of the invention applied to a false key.

As mentioned preliminarily, the joining on of false keys enables detection of the dismantling of the keypad. The false keys are used to set up a permanent connection, by pressure, between the keypad and the printed circuit. Usually, the false keys set up an electrical connection that is monitored to detect opening. This system is relatively complex to implement. On the contrary, implementing false keys by means of a two-part capacitive detector does not require any complex implementation as already described with reference to FIG. 1.

A false key according to an exemplary embodiment of the invention takes the form of a metal "convex spring-operated dome" 13", constituting a second part of the two-part capacitive detector 13. This dome 13" is mounted on the printed circuit 10 which is positioned in the terminal. A ground plane 12 is drawn on the printed circuit 10. The first part 13' of the "capacitive detector" 13 is positioned beneath the dome 13", between the conductive parts of the ground plane. The first part 13' of the "capacitive detector" 13 is not electrically connected to the ground plane but electrically connected to the capacitive microprocessor (not shown). The first part 13' of the "capacitive detector" 13 and the ground plane 12 are buried beneath a layer 14 of prepreg+FR-4 varnish alone well known to those skilled in the art.

The keypad 15 for its part is provided with a push button 15-1. During assembly, this push button 15-1 crushes the dome 13". The reference capacitance is then recorded during the first powering on of the electronic payment terminal. This reference capacitance corresponds to that of the terminal when it is assembled.

If the keyboard of the terminal is dismantled, the dome 13' resumes its initial shape leading to a modification of the capacitance and therefore a detection of the opening. Thus, according to an exemplary embodiment of the invention, it is not necessary to provide for an electrical connection of the dome 13' with the printed circuit 10, and this greatly simplifies the implementation.

3. Division of the "Capacitive Detector" into Two Parts

Figure 2:
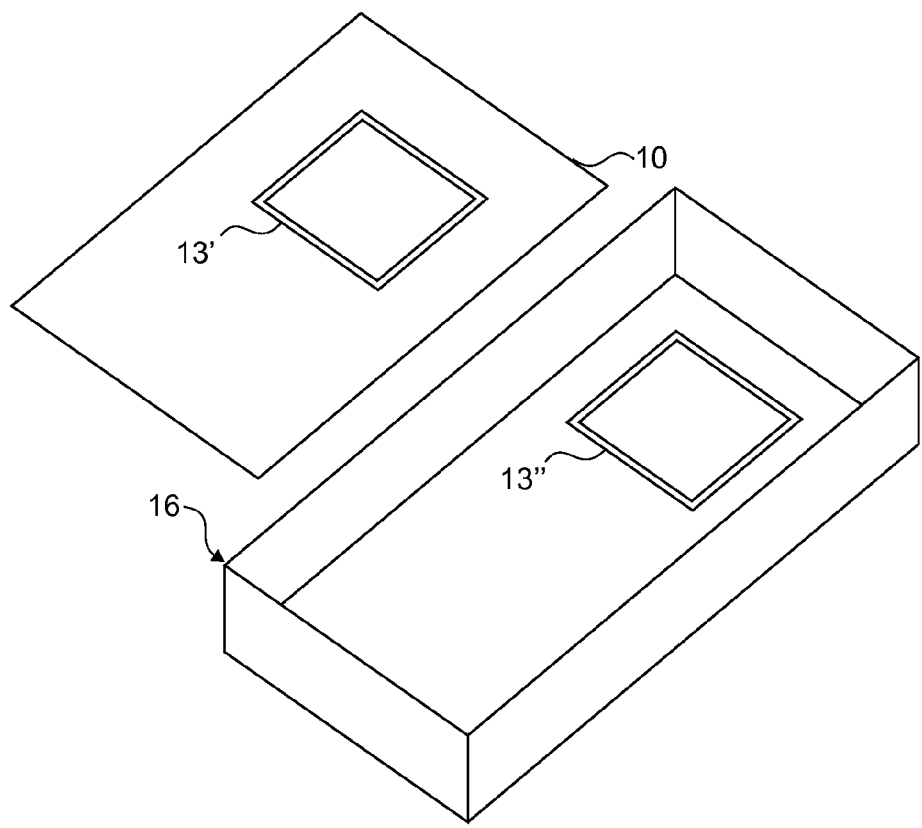
FIGS. 2 and 3 illustrate an embodiment of the invention in which the detection device comprises a two-part capacitive detector.
Figure 3:
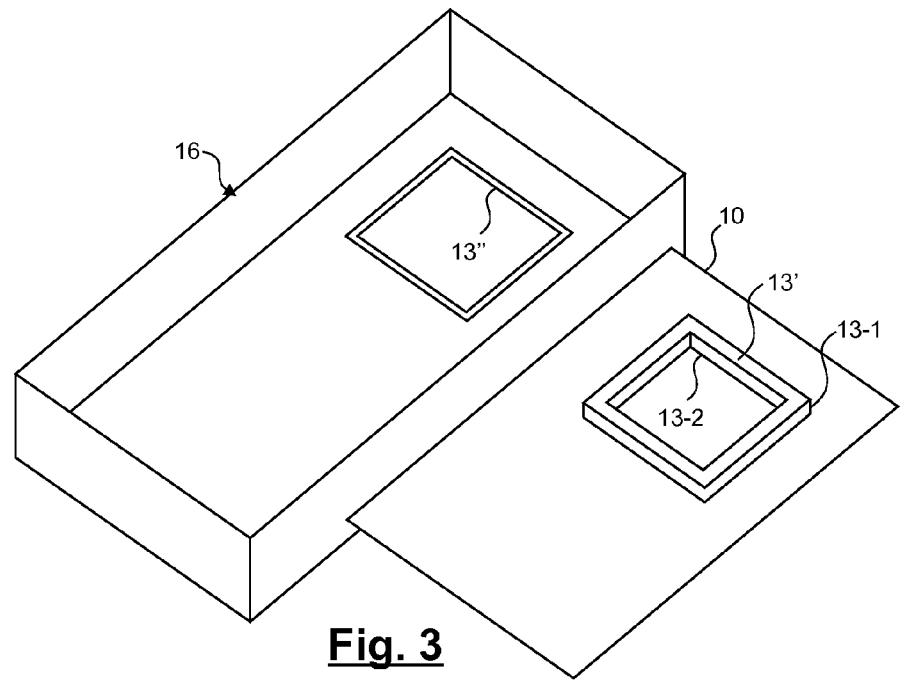

Referring to FIGS. 2 and 3, a description is provided of an embodiment of the invention in which the "capacitive detector" is formed by two parts.

In this embodiment of the invention, a first part 13' of the "capacitive detector" 13 is directly integrated into the printed circuit 10 as a track of this printed circuit. In one alternative embodiment (FIG. 3), the first part of the capacitive detector 13 is shifted to a support 13-1, which is itself bonded to the integrated electronic circuit 10 to which the first part 13' of the capacitive detector 13 is electrically connected (13-2).

A conductive surface, which constitutes the second part 13" of the capacitive detector 13 is positioned on the casing 16 of the terminal. When the terminal is closed, this second part 13" is positioned against the first part 13' of the "capacitive detector" 13.

The first part 13' and the second part 13" of the capacitive detector 13 can be coated with an insulator material or directly poured into the plastic, and do not need to be in direct contact, i.e. it is not necessary that the first part 13' and second part 13", which are conductive parts, of the "capacitive detector" 13 should be in contact. It is also possible to consider leaving a space between the two.

Should the terminal be open, the value of the capacitance measured by the "capacitive detector" 13 is greatly modified relatively to the reference value, and the opening of the terminal is detected. The appropriate security measures are then implemented (erasure of the memory of the terminal or only erasure of the secured memory).

The parts of the "capacitive detector" consist of a conductive surface. A single wire is enough to make these connected surfaces.

4. Anti-Intrusion in a Volume with Single Identification Scheme

Figure 4:
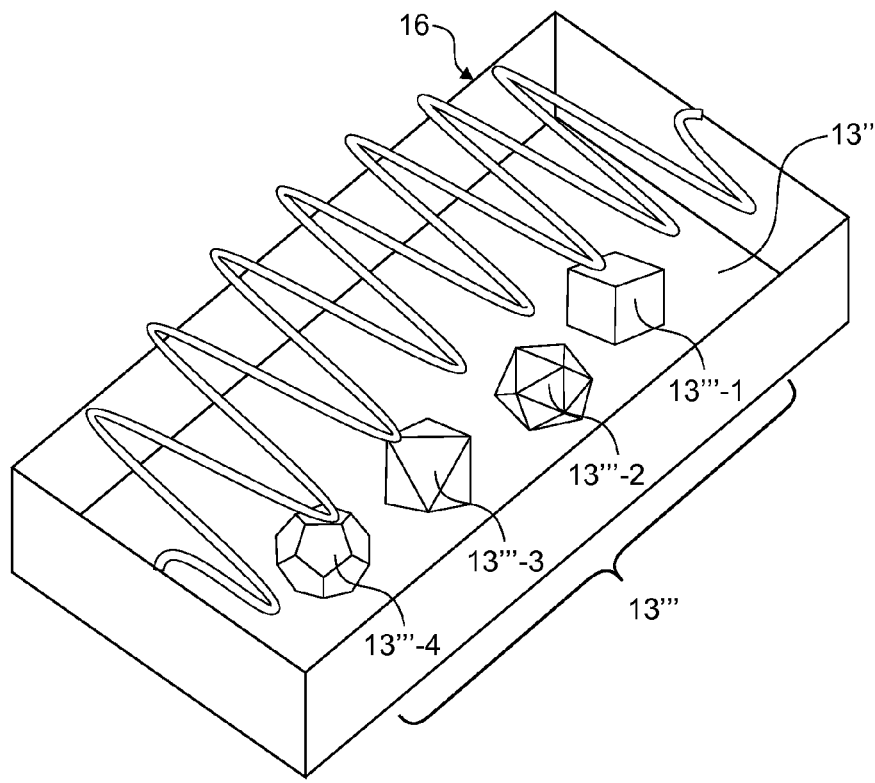
FIG. 4 illustrates an embodiment of the invention in which the detection device comprises a three-part capacitive detector.

In this embodiment of the invention presented with reference to FIG. 4, aimed firstly at preventing the opening of the electronic payment terminal and secondly at making any attempt at snooping by conventional snooping means very improbable, the capacitive detector 13 is also formed by several parts (13', 13" and 13''').

As in the previous embodiment, the first part 13' of the "capacitive detector" 13 is directly integrated into the printed circuit 10 as a track of this printed circuit (or shifted to a support) as indicated in FIGS. 2 and 3.

The base of the casing 16 is lined with a conductive paint (or surface) connected to ground. This conductive surface which extends to the bottom of the casing is the second part of the capacitive detector. The fact that this second part 13" of the "capacitive detector" is connected to ground offers major advantages.

Through the Faraday cage effect, the volume defined by the conductive paint or conductive surface is insulated from external electromagnetic disturbances. Moreover, the variations in measurements of capacitance of the capacitive detector are easy to identify.

This system also greatly reduces the possibilities of electromagnetic snooping on confidential data (PIN, etc). The volume under surveillance is therefore clearly demarcated and determined by the ground planes.

Polyhedral elements with conductive surfaces are also laid out in the casing. These polyhedral elements are the third part 13''' of the capacitive detector 13. These polyhedral elements (13'''-1 to 13'''-4) can be an integral part of the casing or permanently bonded to it. These polyhedral elements are used to identify the casing so as to connect a casing to a single printed circuit. This technique is called "identification by volume pattern".

Thus, in addition to their anti-intrusive function, the third part of the capacitive detector 13''' fulfils a function of identifying the casing and provides an additional level of security.

Indeed, the fact of modifying these polyhedral elements (for example their shape) or their locations significantly modifies the field lines and therefore the value of the capacitance measured by the capacitive processor. Thus, if an attempt is made to reassemble a terminal from several components of other terminals, and especially from a new casing, the reassembled terminal will not be correctly identified.

To reassemble a complete terminal, an attacker cannot re-utilize any new casing whatsoever; it would be necessary for him to use exactly the same combination of polyhedral elements and, for this purpose, he must know this combination. It is easy for the terminal manufacturer to vary the shape, thickness, location so as to obtain a large number of possible combinations and therefore almost nullify the probability that the attacker might recreate the initial capacitive environment of the electronic payment terminal. Thus, even if the attacker successfully reassembles a terminal, it will be unusable.

However, these polyhedral elements are not indispensable to the anti-intrusion function as such. The additional polyhedral elements are used to make the terminal unique at a marginal cost as compared with the cost of joining on of RFID tag chips.

An opening or an intrusion by a very small object that is partly conductive (or even by a dielectric component under certain conditions) is detected and identified as a "attack" leading to the terminal being placed "attack" mode (and leading to an erasure of the confidential data that it contains).

The capacitive detector may consist of a single conductive track, a single wire being enough. It may also be lined with a plastic film or cast in the plastic support of the shell of the terminal.

The last-named technique can apply to the complete terminal or to specific volumes of the terminal.

Another advantage of this technique based on a three-part capacitive detector is that it very sharply limits electromagnetic emissions from the electronic system of the electronic payment terminal making any snooping on confidential data very improbable and also overcomes electromagnetic environmental disturbances through a ground plane system (using the Faraday cage principle).

Furthermore, this system, in parallel with the environmental compensation system (see here below), provides efficient protection against untimely and unsuitable detection of "attacks" due to changes occurring in the surroundings (for example the reception of a call by a cell phone placed beside the terminal etc) causing the loss of secret keys of the terminal. Indeed, these losses of keys entail a major maintenance costs which must be avoided, especially when the payment terminal is the only terminal installed in a sales point.

5. Initial Parametrizing

To make it possible to provide the expected service, the device of an exemplary embodiment of the invention is parameterized in order to determine the predetermined value of the reference capacitance. As already explained, this reference capacitance makes it possible to control the variation of capacitance over time and determine whether this variation exceeds a predetermined value.

When the electronic payment terminal within which the device of an exemplary embodiment of the invention is mounted is first powered on, a measurement of calibration and a parameterization are performed in order to identify the reference value at rest in a neutral electromagnetic environment of the capacitance of the capacitive detector.

Subsequently, this initial calibration sets up the reference capacitance. In standard operating mode, a variation of the capacitance measured relatively to the reference capacitance is of course accepted, to enable normal working of the electronic payment terminal.

A value known as "delta" sets the upper and lower bounds within which the measured capacitances will be considered to be valid. The measurements are made periodically, either at regular intervals or at predefined times (at night for example).

In the event of a cut in the mains electrical power supply, the security units of the terminal continue to work on battery. In this case, a system for periodically putting the capacitive processor to sleep or reviving it enables regular measurement of the capacitive detectors (for example every 500 milliseconds).

Indeed, since the device of an exemplary embodiment of the invention consumes very little electrical current, it can be implemented without any mains electrical power supply. Thus, the system of an exemplary embodiment of the invention can provide for the security of the terminal continuously with or without the presence of mains current.

Under certain conditions, a system of compensation for ambient conditions can modify the reference value or base line. Such a system can be joined on to the device of an exemplary embodiment of the invention to provide for efficient operation of the electronic payment terminal as a function of the surroundings in which it is installed.

A software filtering is also performed to highlight events modifying field lines that are not true operations of installing fraudulent devices (handling of the terminal etc).

All these measurements are driven by a micro-program associated with the capacitive measurement microprocessor.

Figure 5:
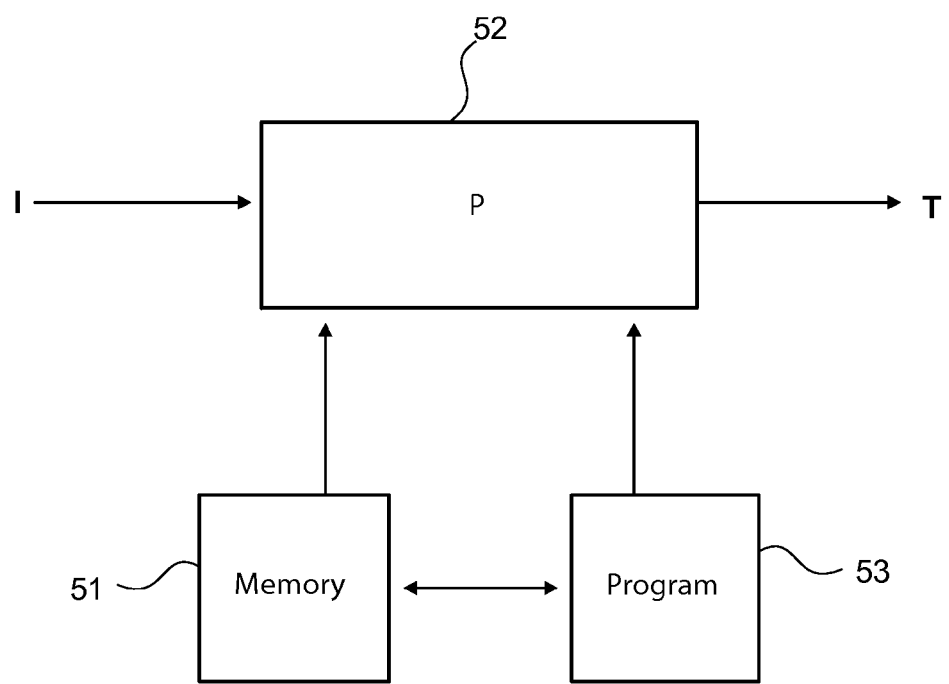
FIG. 5 is a schematic view of a payment terminal according to an embodiment of the invention.

Referring to FIG. 5, we present an embodiment of a payment terminal according to an exemplary embodiment of the invention.

Such a terminal comprises a memory 51 constituted by a buffer memory, a processing unit 52, equipped for example with a microprocessor P, and driven by the computer program 53 implementing the protection method according to an exemplary embodiment of the invention.

At initialization, the instructions of the computer program code 53 are for example loaded into a RAM and then executed by the processor of the processing unit 52. The processing unit 52 inputs at least one piece of information I such as identifiers of localization areas. The microprocessor of the processing unit 52 implements the steps of the protection method described here above according to the instructions of the computer program 53 to deliver a piece of processed information T such as the detection of an attack leading to the elimination of the protected data. To this end, the terminal comprises, in addition to the buffer memory 51:

- at least one capacitive detector comprising two parts, a first part electrically connected to said printed circuit and a second part mounted within said casing of said electronic payment terminal without being electrically connected to said first part, said at least one capacitive detector being configured to deliver a reference capacitance when it is mounted in said electronic payment terminal;
- a capacitive measurement microprocessor electrically connected to said at least one capacitive detector, configured to detect a variation in capacitance of said at least one capacitive detector;
- a transmitter configured for transmitting a piece of information representing said variation of capacitance when an absolute value of a difference between said measured capacitance and said reference capacitance exceeds a predetermined threshold.

These elements are driven by the microprocessor of the processing unit.

Although the present disclosure has been described with reference to one or more examples, workers skilled in the art will recognize that changes may be made in form and detail without departing from the scope of the disclosure and/or the appended claims.

The invention claimed is:

1. A device for protecting an electronic payment terminal, said electronic payment terminal comprising at least one printed circuit and one casing, wherein said device for protecting comprises:

- at least one capacitive detector comprising a first part electrically connected to said printed circuit, a second part mounted within said casing of said electronic payment terminal without being electrically connected to said first part, and a third part comprising at least one polyhedral element lined with a conductive surface, said at least one capacitive detector being configured to deliver a reference capacitance when said at least one capacitive detector is mounted in said electronic payment terminal, wherein said at least one polyhedral element has at least one of a shape, thickness or location that is unique for said device, and wherein the second part changes at least one of shape or location relative to the first part when the terminal is dismantled leading to a variation in a measured capacitance;

a capacitive measurement microprocessor electrically connected to said at least one capacitive detector, configured to detect a variation in capacitance of said at least one capacitive detector;

a transmitter for transmitting a piece of information representing said variation in capacitance when an absolute value of a difference between said measured capacitance and said reference capacitance exceeds a predetermined threshold.

2. The device for protecting according to claim 1, wherein the device further comprises a calibrator configured to deliver said reference capacitance.

3. The device for protecting according to claim 1, wherein said at least one third part is positioned on said casing of said terminal.

4. The device according to claim 1, wherein said at least one third part defines a unique capacitance associated with said casing of said terminal.

5. The device of claim 1, wherein the second part of the capacitive detector comprises a conductive surface that lines a bottom of the casing so as to define a volume of space within the casing that is insulated from external electro-magnetic disturbance.

6. A method for protecting an electronic payment terminal, comprising at least one printed circuit and one casing, said method comprising at least one iteration of the following steps:

measuring a current value of capacitance by at least one capacitive detector of a device comprising:

said at least one capacitive detector, which comprises a first part electrically connected to said printed circuit, a second part mounted within said casing of said electronic payment terminal without being electrically connected to said first part, and a third part comprising at least one polyhedral element lined with a conductive surface, said at least one capacitive detector being configured to deliver a reference capacitance when said at least one capacitive detector is mounted in said electronic payment terminal, wherein said at least one polyhedral element has at least one of a shape, thickness or location that is unique for said device, and wherein the second part changes at least one of shape or location relative to the first part when the terminal is dismantled leading to a variation in a measured capacitance; and a capacitive measurement microprocessor electrically connected to said at least one capacitive detector, configured to detect a variation in capacitance of said at least one capacitive detector;

computing an absolute value of a difference between said measured capacitance and said reference capacitance; and transmitting a piece of information representing said variation of capacitance when said absolute value exceeds said predetermined threshold.

7. The method according to claim 6 wherein the method further comprises, during a first powering on of said electronic payment terminal, a step of calibrating said terminal delivering said reference capacitance.

8. An electronic payment terminal comprising:
at least one printed circuit and one casing;
at least one device for protecting the electronic payment terminal, the device comprising:
at least one capacitive detector comprising a first part electrically connected to said printed circuit,
a second part mounted within said casing of said electronic payment terminal without being electrically connected to said first part, a third part comprising at least one polyhedral element lined with a conductive surface,
said at least one capacitive detector being configured to deliver a reference capacitance when said at least one capacitive detector is mounted in said electronic payment terminal, wherein said at least one polyhedral element has at least is unique for said device, and wherein the second part changes at least one of shape or location relative to the first part when the terminal is dismantled leading to a variation in a measured capacitance;

a capacitive measurement microprocessor electrically connected to said at least one capacitive detector, configured to detect a variation in capacitance of said at least one capacitive detector;

a transmitter, which transmits a piece of information representing said variation in capacitance when an absolute value of a difference between said measured capacitance and said reference capacitance exceeds a predetermined threshold.

9. A non-transitory computer-readable carrier comprising a computer software product stored thereon and executable by a microprocessor, the product comprising program code instructions to execute a method for protecting an electronic payment terminal when the program is executed on a microprocessor, wherein the method comprises at least one iteration of the following steps:

measuring a current value of capacitance by at least one capacitive detector of a device comprising:

said at least one capacitive detector, which comprises a first part electrically connected to a printed circuit, a second part mounted within a casing of said electronic payment terminal without being electrically connected to said first part, and a third part comprising at least one polyhedral element lined with a conductive surface, said at least one capacitive detector being configured to deliver a reference capacitance when said at least one capacitive detector is mounted in said electronic payment terminal, wherein said at least one polyhedral element has at least one of a shape, thickness or location that is unique for said device, and wherein the second part changes at least one of shape or location relative to the first part when the terminal is dismantled leading to a variation in a measured capacitance; and a capacitive measurement microprocessor electrically connected to said at least one capacitive detector, configured to detected a variation in capacitance of said at least one capacitive detector;

computing an absolute value of a difference between said measured capacitance and said reference capacitance; and transmitting a piece of information representing said variation of capacitance when said absolute value exceeds said predetermined threshold.

* * * * *